United States Patent
Begemann et al.

(10) Patent No.: US 7,404,916 B2
(45) Date of Patent: Jul. 29, 2008

(54) PROCESS FOR PRODUCING POLYURETHANE MOLDINGS

(75) Inventors: Michael Begemann, Freudenberg (DE); Klaus Sieben, Königswinter (DE); Jürgen Wirth, Köln (DE); Wolfgang Pawlik, Köln (DE)

(73) Assignee: Hennecke GmbH, Leverkusen (DE)

( * ) Notice: Subject to any disclaimer, the term of this patent is extended or adjusted under 35 U.S.C. 154(b) by 540 days.

(21) Appl. No.: 10/732,108

(22) Filed: Dec. 9, 2003

(65) Prior Publication Data

US 2004/0130049 A1 Jul. 8, 2004

(30) Foreign Application Priority Data

Jan. 7, 2003 (DE) ................................ 103 00 101

(51) Int. Cl.
*B29B 7/76* (2006.01)

(52) U.S. Cl. ............... 264/40.1; 264/328.6; 422/111; 422/112; 422/133

(58) Field of Classification Search .............. 264/40.1, 264/328.6, 240; 422/133, 110, 111, 112
See application file for complete search history.

(56) References Cited

U.S. PATENT DOCUMENTS

| | | | | |
|---|---|---|---|---|
| 4,399,104 A | * | 8/1983 | Coblenz et al. ............. | 422/111 |
| 4,944,599 A | * | 7/1990 | Soechtig ..................... | 366/132 |
| 5,261,741 A | * | 11/1993 | Hladis ......................... | 366/132 |
| 5,992,686 A | * | 11/1999 | Cline et al. ................... | 222/1 |
| 6,143,214 A | * | 11/2000 | Barlow ........................ | 264/40.1 |

FOREIGN PATENT DOCUMENTS

| | | | |
|---|---|---|---|
| DE | 100 20 157 | * | 11/2001 |
| EP | 0 143 926 | * | 6/1985 |
| EP | 0 494 453 | * | 7/1992 |
| EP | 0 599 104 | * | 6/1994 |

* cited by examiner

*Primary Examiner*—Jill L Heitbrink
(74) *Attorney, Agent, or Firm*—Lucas & Mercanti, LLP

(57) ABSTRACT

Cellular or compact polyurethane moldings are produced by conveying at least one isocyanate component and at least one polyol component by a metering machine in dispensing manner into a mixing chamber via component lines to form a polyurethane reaction mixture. Subsequently, the polyurethane reaction mixture is discharged from the mixing chamber into a mold. The pressures of the components are registered by means of pressure transducers in the component lines and are transmitted to a monitoring device. The temporal profiles of the pressures are compared with reference pressure values stored in the monitoring device. A malfunction is signalled in the event of deviation of at least one of the measured pressure profiles from the reference pressure profile beyond a predetermined tolerance threshold.

4 Claims, 5 Drawing Sheets

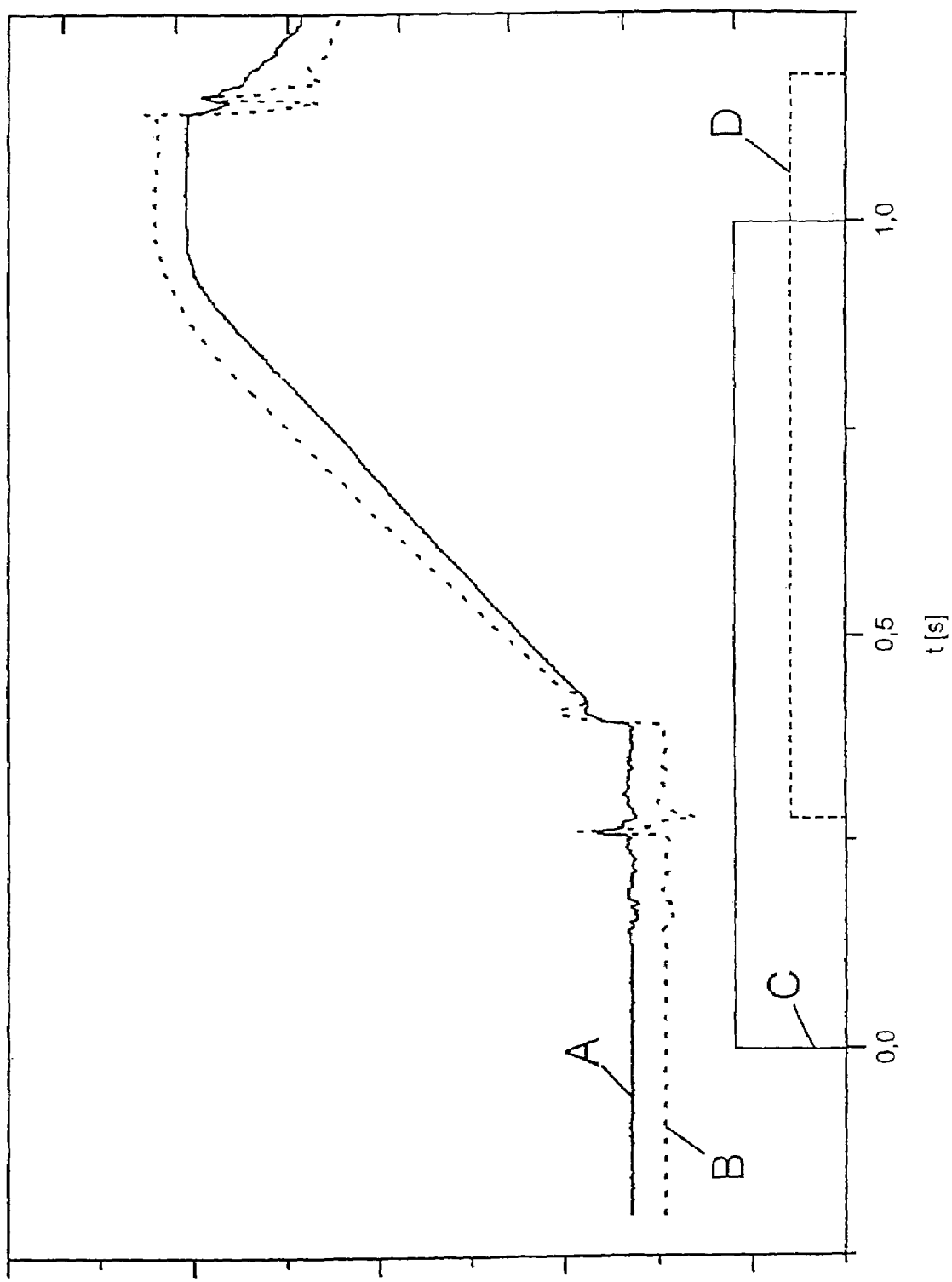

PROCESS FOR PRODUCING POLYURETHANE MOLDINGS

BACKGROUND OF THE INVENTION

The invention relates to a process for producing polyurethane moldings, wherein the reaction components are mixed under high pressure in a mixing head, the pressures and the positions of the mixing head slides or of the injector needles and the positions of the hydraulic valves are recorded, registered and evaluated by a monitoring device.

The production of polyurethane moldings can be undertaken in accordance with the so-called RIM (Reaction Injection Moulding) process, i.e., with molding tools in which the upper and lower parts of the mold have been moved together and consequently form a closed cavity. In this case, the mixing head with its outflow system is connected to the cavity via a runner. But the production of polyurethane moldings may also be undertaken with molding tools in which the upper part of the mold is first opened and the polyurethane reaction mixture is charged into the open cavity via the outflow system of the mixing head, and the upper part of the mold is closed after the end of the shot, that is, the mold is closed.

In the RIM process according to the state of the art (shown in FIGS. 1 and 2), at least two liquid components that react with one another are supplied by a metering machine to a mixing head in a predetermined mass-flow ratio via pipelines or hose lines. The mixing head has the task of mixing these components, as a rule isocyanate and polyol, homogeneously with one another and of emitting the polyurethane reaction mixture arising in the process via a runner, which is generally an integral part of the mold, into a mold (molding tool). The liquid reaction mixture that has been transferred into the mold cures after some time. After this, the mold, which as a rule is of multi-part construction, can be opened in order to remove the finished molding. Generally, the mold is integrated within a mold carrier (not illustrated) which opens and closes the mold and, in the closed state, keeps it closed by acting against the internal pressure arising in the mold. In the case of the RIM process, the mixing head is, as a rule, permanently attached to the molding tool. But it is also possible to dock the mixing head onto the tool prior to each shot with a special mixing head portal, or manually. The mixing heads that are employed in this case are so-called high-pressure mixing heads which operate, for example, in accordance with the counterflow injection process.

The production of the molding can be subdivided into phases that take place in succession. At the start of the production process, the hydraulically driven slide which is located in the interior of the mixing head is located in a position that permits the recirculation of the components via the mixing head. This means that the mass flow of the components, which is metered by the metering machine, flows to the mixing head via the inlet. In the mixing head the flow of the components is channelled by grooves and channels into the return flow. From there the mass flows of the components flow back to the metering machine. The channels in the mixing head which are flowed through by the components may also be formed by a different geometrical arrangement of mixing head casing and slide, or even by mixing head casing and several slides. The construction of the mixing head that is illustrated in the figures is only one possible variant. Starting from an empty closed mold (FIG. 1), one or more hydraulically driven slides are moved in the high-pressure mixing head. These slides have the task of channelling the fluid flows of the components to be mixed in such a way that they are combined and a homogeneously mixed reaction mixture arises which emerges from the mixing head and is emitted into the mold. In this connection, so much reaction mixture is emitted that the mold is filled (FIG. 2).

In order to emit the exact quantity required into the molding tool, the metering of the reaction components is undertaken with the aid of a metering machine. This machine meters each component at a rigidly defined mass flow-rate. All the components are metered for the same established period. This period is monitored via an electrical control system. The start and the end of the metering process are controlled by the movement of one or more hydraulically moved slides in the mixing head. After the mixing and filling process, the hydraulic slide or slides move(s) in such a way that residues of the polyurethane reaction mixture are totally ejected from the mixing head and the mass flows of the components recirculate again via the mixing head. Subsequently, the reaction mixture which has been introduced into the mold cures, and a solid polyurethane molding is formed which can be removed from the mold after the mold has been opened.

In the course of RIM production with add-on mixing heads, serious damage to the plant may occur for many reasons which lie outside the region of metering (metering machine, mixing head). For example, it is possible that residues of a finished molding in the sprue region of the mould are forgotten in the course of demolding. As a result of this, the outlet of the mixing head then becomes sealed, and during the metering process an inadmissible pressure arises in the component lines which connect the metering machine and the mixing head. This then results in the malfunction and automatic shutdown of the entire plant because the maximum admissible pressure has been exceeded. The shutdown is effected by the electronic control system of the plant.

Such a shutdown by reason of exceeding maximum admissible pressure may also occur as a result of problems in the metering area (metering machine, mixing head). For instance, it is possible for a nozzle in the mixing head to become clogged by particles of dirt. This brings about a higher flow resistance and leads to the exceeding of the maximum admissible pressure. Problems that are caused in the region of metering (metering machine, mixing head) can, as a rule, be recognized by the operator of the machine and also result in no damage to the plant when the plant is switched on again. In contrast, problems caused outside the system constituted by metering machine and mixing head may result in damage when the plant is switched on again.

If, for example, the runner is clogged, the pressure in one component line rises more quickly, for example by reason of a higher discharge capacity, than in the other. Therefore a partial flow of component is forced from the component line having the higher pressure into the line having the lower pressure via the mixing chamber 9 (FIG. 2) which is filled with reaction mixture. This is possible because the component lines expand in the event of a rise in pressure and consequently enlarge their volume. If, for example, the pressure in the isocyanate line rises more quickly than the pressure in the polyol line, isocyanate is able to enter the polyol line. This then results in the formation of a reaction mixture in the polyol line, and solid polyurethane is formed. If the plant is put into operation again after this occurs, the reaction mixture is entrained through the entire plant by the recirculation of the components. The result of this is that all of the hose lines and pipelines become clogged with solid, fully reacted polyurethane. If the switching-on of the plant again after such a fault were to be prevented, only the component lines that are located in the vicinity of the mixing head would be affected.

RIM plants known hitherto have been equipped with an automatic pressure monitoring system for the purpose of protecting the plant. This system shuts down the plant automatically if a maximum admissible pressure is exceeded in one of the component lines. However, this pressure shutdown only takes account of the result of the exceeding of the pressure, irrespective of when and in what connection it has occurred. This means that other parameters of the plant are not taken into account and cannot be considered in connection with the pressure shutdown, so that for the operator of the plant it is not evident where the cause of an automatic shutdown by reason of an exceeding of the admissible pressure is to be sought.

SUMMARY OF THE INVENTION

It is therefore the object of the invention to make available a process for producing polyurethane moldings, wherein, after a rise in pressure and shutdown of the metering of the components, an estimate can be made as to where the fault has occurred and whether the plant can be put back into operation without major repair or cleaning.

BRIEF DESCRIPTION OF THE DRAWINGS

FIGS. 4 and 5 show, in exemplary manner, temporal profiles of the component pressures for polyol (A) and isocyanate (B) and also of the switching signal (C) and of the initiator signal (D) in the RIM process.

DETAILED DESCRIPTION OF THE INVENTION

Figure 1:
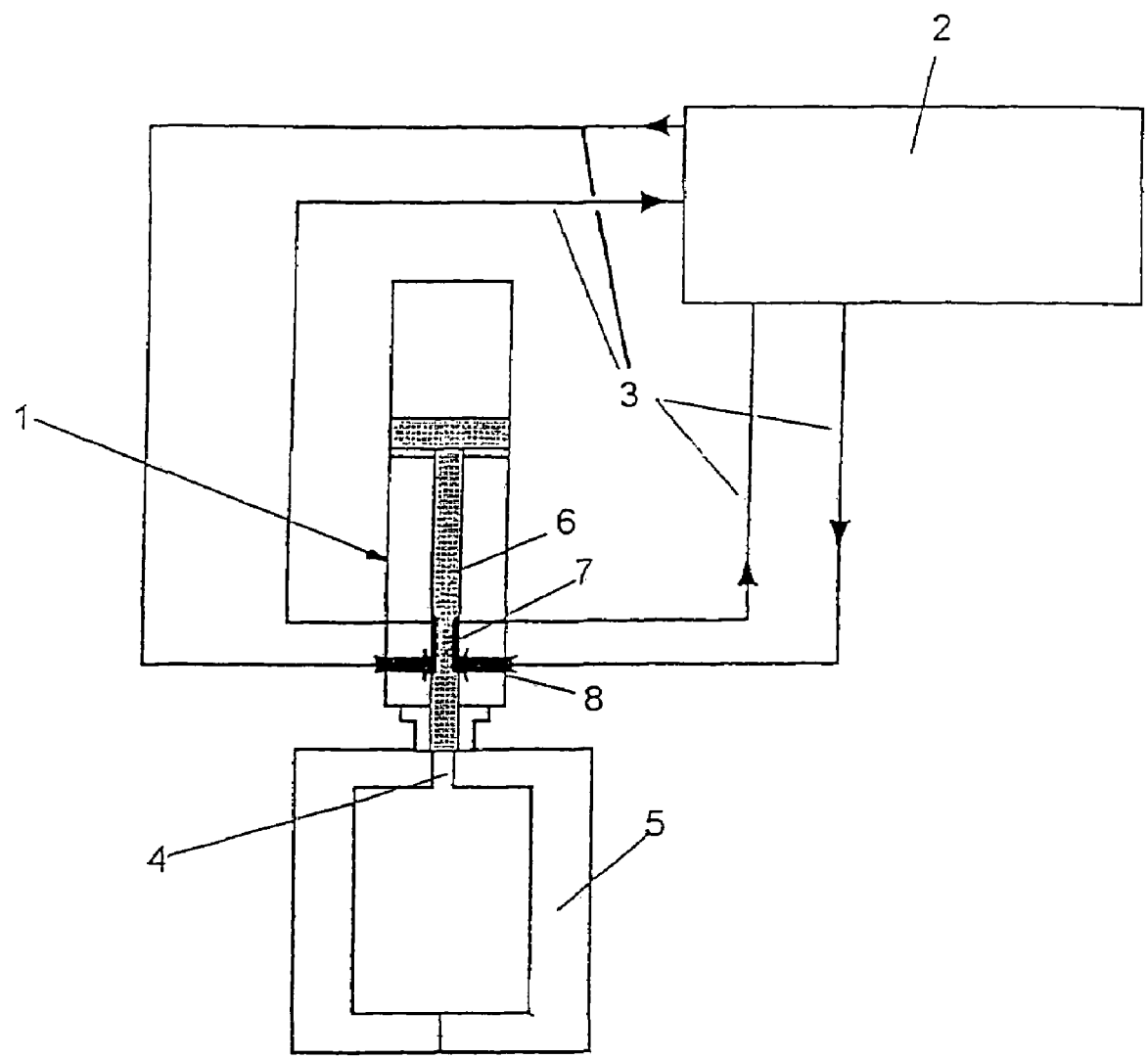
FIG. 1 shows a plant for producing polyurethane moldings in accordance with the RIM process, wherein the educt components are recycled via the mixing head.

The invention will be elucidated in the following substantially on the basis of the example provided by the RIM process, but it is equally applicable to processes in which the polyurethane reaction mixture is charged into the open mold via the mixing head outflow system.

The present invention relates to a process for producing cellular or compact polyurethane moldings, wherein at least one isocyanate component and at least one polyol component are conveyed by a metering machine into a mixing head via component lines and are mixed in the mixing chamber to form a polyurethane reaction mixture, and the polyurethane reaction mixture is subsequently discharged from the mixing chamber into a mold. The pressures of the components are registered by means of pressure transducers in the component lines and transmitted to a monitoring device. The temporal profiles of the pressures are compared with reference pressure values saved in the monitoring device and a malfunction is signalled in the event of deviation of at least one of the measured pressure profiles from the saved reference pressure profile beyond a predetermined tolerance threshold.

The pressures of the components may also, for example, be measured in the mixing chamber or in the mold and transmitted to the monitoring device.

In the process according to the invention, a signal is also preferably output regarding the location and the time, respectively, at which the deviation of the measured pressure profile from the saved reference pressure profile beyond the predetermined tolerance threshold has occurred.

In the course of implementation of the process according to the invention an estimate can be made as to whether a malfunction or an error condition is present, the cause of which is to be sought in the region of metering (metering machine, mixing head) or whether a malfunction has occurred that is caused by a fault outside of the region of metering, for example in the molding tool. In addition, an estimate can be made as to whether serious damage has occurred or whether the damage is less serious or slight.

In a preferred embodiment of the process, the metering of the components into the mixing chamber is initiated and terminated by the opening and closing of slides by which the openings of the nozzles into the mixing chamber are opened or closed, and the opening and closing of the slides are effected hydraulically and are initiated by the opening and closing of respectively assigned hydraulic valves. The opening and closing of the hydraulic valves and the times of the opening and closing of the slides are also preferably transmitted to the monitoring device which temporally assigns the transmitted positions of the slides and the transmitted positions of the hydraulic valves to the transmitted pressure profiles of the components, so that the transmitted pressure profiles of the components can be temporally assigned with respect to the start of the shot and the end of the shot.

The invention will be elucidated in more detail in the following on the basis of the Figures.

Figure 2:
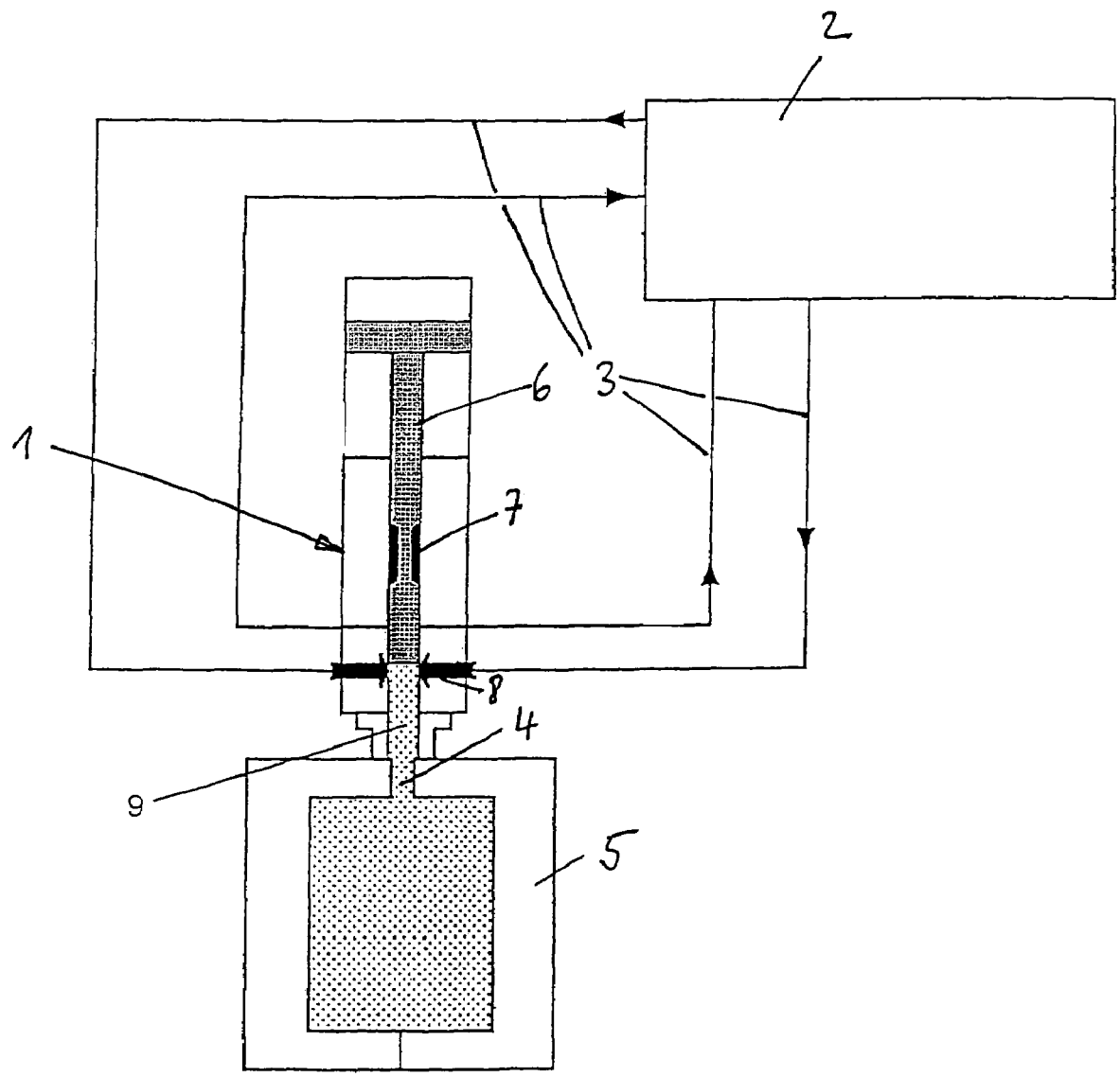
FIG. 2 shows a plant for producing polyurethane moldings in accordance with the RIM process, wherein the components are injected through a nozzle into the mixing chamber and are mixed therein and are subsequently charged into the cavity via the mixing-head outflow system and the runner.
Figure 3:
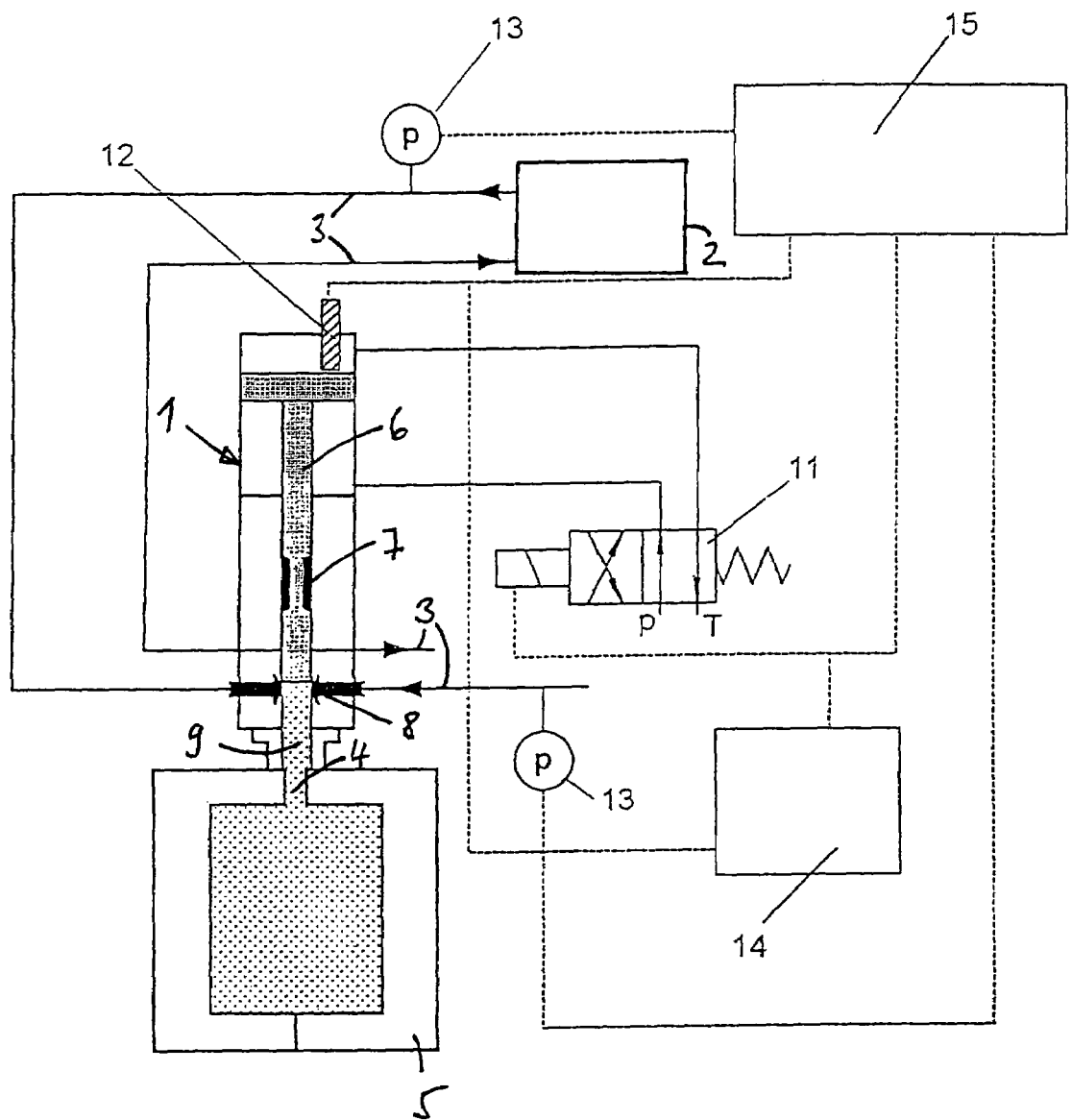
FIG. 3 shows a plant for producing polyurethane moldings in accordance with the RIM process, in which the process according to the invention can be implemented.

FIGS. 1 and 2 show the same plants in different states of production. In FIG. 1, the plant is shown in circulatory mode of operation, and in FIG. 2 it is shown in shot operation. FIG. 3 is based upon FIG. 2 and includes, in addition, elements needed for the control and monitoring of the process in accordance with the present invention. The reference symbols of the elements in FIG. 1 therefore also apply to the corresponding elements in FIGS. 2 and 3.

In the RIM plant according to FIG. 3, the hydraulic switching signals are generated by the plant control system 14 and serve the purpose of actuating hydraulic valves 11. The hydraulic valves finally bring about the movement of the hydraulically driven slides 6 in the mixing head 1. Certain positions of these slides 6 are interrogated via initiators 12, for example, inductive proximity switches, and the signal thereof is transmitted to the plant control system 14 and to the monitoring device 15. In this connection the plant control system 14 and the monitoring device 15 may also be combined in one instrument. The sequence of hydraulic switching signals and initiator signals in one production cycle is predetermined for each type of mixing head and is characteristic thereof. On the basis of this sequence it is possible for the phase of the production process to be determined. These signals and the measured pressure profiles in the component lines 3, through which the components flow from the metering machine 2 to the mixing head 1, are transmitted to the plant control system 14 and to the monitoring device 15. For the purpose of measuring the pressures, pressure transducers 13 are integrated into the lines.

The temporal sequence of the individual signals during the production of the polyurethane moldings may be different for varying types of mixing head and other varying components of the plant.

Figure 4:
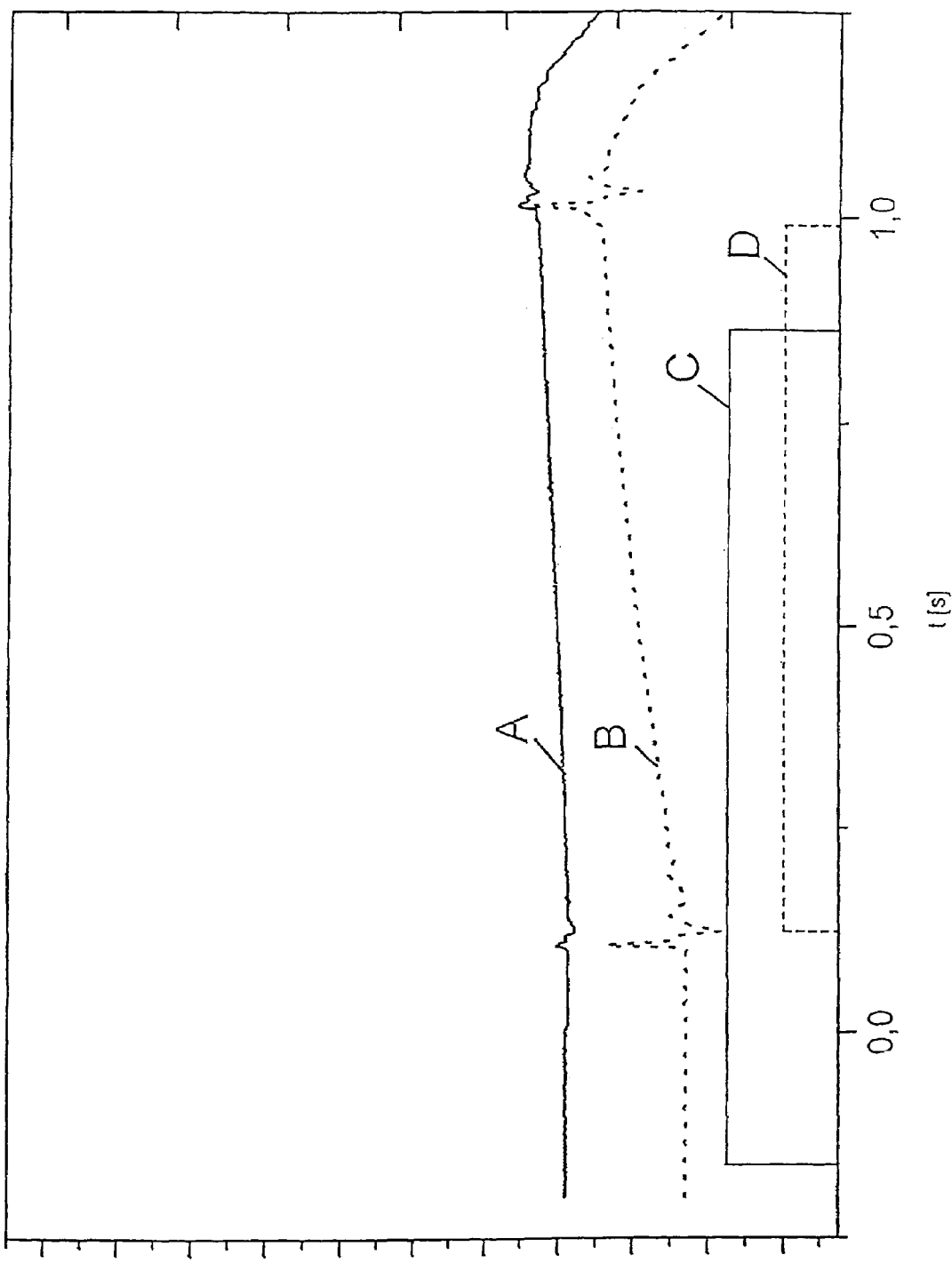

For the plant that is represented in FIG. 3, the signal profiles and pressure profiles for a normal, that is to say trouble-free, production cycle appear typically as illustrated in FIG. 4.

The signal sequence may be subdivided into three phases. Before the start of the first phase (Phase 1), the slide 6 is in the position in which the components are conveyed in a circuit via grooves and channels 7. The first phase is initiated by the plant control system 14 emitting a hydraulic switching signal that switches the hydraulic valve by which the slide 6 is moved. The hydraulic drive unit of the slide 6 is accordingly selected. The slide 6 therefore moves out of the position in which the educt components are recycled, into the position in which the components are injected through the nozzles 8 into the mixing chamber 9 (production position). Once said slide has arrived in the production position, the initiator 12 emits a signal to the plant control system 14 and to the monitoring device 15. Once the plant control system 14 has received the signal from the initiator 12 and the slide 6 is in the production position, the second phase begins. In the second phase, the components are mixed in the mixing chamber 9 and emerge from the mixing chamber 9 in the form of a liquid polyurethane reaction mixture and are channelled into the molding tool 5. The third phase begins when the molding tool 5 has been filled to the desired degree, and is initiated by renewed switching of the hydraulic switching signal. The third phase preferably ends after a fixed time, for example after 300 milliseconds.

In the case of a normal, that is to say trouble-free, production sequence, the component-pressure profiles appear typically as represented in FIG. 4. Both component pressures in Phase 2 are approximately as high as or only insignificantly greater than they were in or before Phase 1. If a fault occurs, the cause of which lies outside the region of metering (metering machine, mixing head), such as in the case of a forgotten runner 4, for example, then the profiles of the component pressures appear as illustrated in FIG. 5. Both component pressures rise very considerably in Phase 2 until the maximum admissible pressure is attained and the plant control system 14 automatically shuts down the metering. By virtue of the process according to the invention, the individual phases, which are defined by the hydraulic switching signal and the initiator signal, can be registered and differentiated.

Until now, RIM plants have been constructed with a plant control system which shuts down the metering of the components when the maximum admissible pressure is exceeded. But in these plants the plant control system outputs no information as to at what time and therefore in which phase of the production and by reason of which cause the maximum admissible pressure is being exceeded. Only by recognizing the relationship between the exceeding of the maximum admissible pressure of the two components and the time of this event, which correlates with the various phases of production, is it possible to draw conclusions as to the location of the cause of the fault. For if the malfunction occurs, for example, only after adjustment of the slides in the production position, that is, in the second phase, then the malfunction presumably does not lie in the region of metering but rather in the region of the runner 4 or of the molding tool 5.

It is also possible to estimate, on the basis of the temporal profile of the component pressures in Phase 2, the seriousness of the malfunction. In this connection, the analysis of the pressure profiles may be carried out as follows: The time-interval $\Delta t$ between the start of Phase 2 and the attaining of the maximum admissible pressure is measured. Subsequently the difference of maximum attained pressure $p_{max}$ and pressure $p_1$ in Phase 1 is derived. In this connection, the pressure $p_1$ in Phase 1 may be, for example, the pressure averaged over the entire Phase 1. Subsequently, the quotient of this difference with the time-interval $\Delta t$ is derived.

$$\text{Quotient} = \frac{p_{max} - p_1}{\Delta t}$$

The value of the computed quotient is compared with at least one saved comparative value for the quotient. If the quotient assumes a value that is greater than the comparative value, this indicates serious damage to the plant. If the value of the quotient is smaller than the comparative value, this indicates that little damage or even no damage at all has arisen. In this connection, the assessment of the damage may be differentiated by virtue of an increase in the number of saved comparative values.

EXAMPLES

Example 1

Sealed Runner

If the runner 4 in FIG. 2 has been sealed, the pressure rises immediately as soon as the free spaces in the mixing head 1, that is to say the mixing chamber 9 and the adjoining outflow system, have been filled with reaction mixture. The rise in pressure is then extremely steep, depending on the discharge capacity. This means that the value of the quotient is high. If not rectified, such a malfunction results in considerable damage, corresponding to the high value of the quotient.

Example 2

Metering-time too Long

In the case of a metering-time that is too long, too much polyurethane reaction mixture is conveyed into the mold 5. In this case, in Phase 2 a rise in pressure only occurs at a very late stage. The rise in pressure occurs when the molding tool has been completely filled. In addition, the rise in pressure is then distinctly flatter than in Example 1, since a conventional molding tool never closes in an entirely impervious manner. Consequently, some reaction mixture is always able to emerge from the molding tool. In this connection, if the maximum admissible pressure is exceeded, then no damage to the plant or only slight damage to the plant arises. For this case the quotient assumes a small value.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a cellular or compact polyurethane molding comprising:
   a) conveying at least one isocyanate component and at least one polyol component by a metering machine into a mixing head via component lines;
   b) mixing the isocyanate and polyol components in a mixing chamber to form a polyurethane reaction mixture;
   c) discharging the polyurethane reaction mixture from the mixing chamber into a mold;
   d) registering pressure of the isocyanate and polyol components by means of a pressure transducer in each of the component lines;
   e) transmitting the pressures registered in d) to a monitoring device to form transmitted pressure profiles;

f) comparing the transmitted pressures profiles with corresponding reference pressure profiles stored in the monitoring device;
g) signalling a malfunction in the event that at least one of the transmitted pressure profiles deviates from the corresponding reference pressure profile beyond a predetermined tolerance threshold;
h) metering of the isocyanate and ployol components into the mixing chamber is initiated and terminated by opening and closing of one or more slides associated with a nozzle of each of the component lines into the mixing chamber, the opening and closing of the slides effected hydraulically by opening and closing of associated hydraulic valves;
i) transmitting opening and closing times of the hydraulic valves to the monitoring device; and
j) assigning temporally the opening and closing times of the hydraulic valve to the transmitted pressure profiles in the monitoring device, so that the transmitted pressure profiles are temporally assigned to a start and a stop of a shot of polyurethane reaction mixture to the mold.

2. The process of claim 1 further comprising:
outputting a signal that indicates location of any deviation of measured pressure from the corresponding reference pressure profile beyond the tolerance threshold.

3. The process of claim 1 further comprising:
calculating temporal pressure gradients from the transmitted pressure profiles of the components;
comparing the calculated temporal pressure gradients with reference pressure gradients; and
estimating the seriousness of a malfunction from any deviation of the calculated temporal pressure gradients from the reference pressure gradients.

4. The process or claim 1, further comprising:
transmitting opening and closing times of the slide to the monitoring device; and
assigning temporally the opening and closing times of the slides to the transmitted pressure profile in the monitoring device.

* * * * *